United States Patent
Kritt et al.

(10) Patent No.: US 9,736,645 B2
(45) Date of Patent: Aug. 15, 2017

(54) PERFORMING ACTION BASED ON CURRENT SITUATION OF USER DETERMINED BASED ON AT LEAST DISTANCES BETWEEN DEVICES

(71) Applicant: International Business Machines Corporation, Armonk, NY (US)

(72) Inventors: Barry A. Kritt, Emerald Isle, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/197,133

(22) Filed: Jun. 29, 2016

(65) Prior Publication Data

US 2017/0164149 A1 Jun. 8, 2017

Related U.S. Application Data

(63) Continuation of application No. 14/959,667, filed on Dec. 4, 2015.

(51) Int. Cl.
*H04W 24/00* (2009.01)
*H04W 4/02* (2009.01)
*H04W 4/20* (2009.01)
*H04W 88/02* (2009.01)

(52) U.S. Cl.
CPC .......... *H04W 4/023* (2013.01); *H04W 4/206* (2013.01); *H04W 88/02* (2013.01)

(58) Field of Classification Search
CPC .............................. H04W 4/023; H04W 4/206

USPC .......... 455/456.6, 404.2, 414.1, 414.2, 456.1
See application file for complete search history.

(56) References Cited

U.S. PATENT DOCUMENTS

| | | | | |
|---|---|---|---|---|
| 8,611,929 | B1* | 12/2013 | Vandehey | H04W 4/02 455/456.3 |
| 2005/0136949 | A1* | 6/2005 | Barnes | G06Q 10/1053 455/461 |
| 2013/0232010 | A1 | 9/2013 | Kritt et al. | |
| 2013/0331130 | A1 | 12/2013 | Lee | |
| 2014/0052681 | A1* | 2/2014 | Nitz | H04L 51/02 706/46 |

(Continued)

OTHER PUBLICATIONS

Schillings, B., "Method and System for Identifying a User's Context Using Software defined Radio in a Mobile Device", IP.com, IPCOM000237398D, Yahoo, Jun. 17, 2014, 2 pp.

(Continued)

*Primary Examiner* — Chuck Huynh
(74) *Attorney, Agent, or Firm* — Damion Josephs

(57) ABSTRACT

A distance between a mobile device of a user and each of a number of other devices is determined. The other devices can include mobile devices of other users associated with the user and stationary devices associated with the user. Current values of sensors can be received; each sensor corresponds to one of the other devices. A current situation of the user is determined based on the distances between the mobile device and the other devices and on the current values of the sensors. An action is performed based on the current situation. The action can include selecting and displaying an advertisement appropriate to the current situation, and posting a social networking service post corresponding to the current situation on a social networking service.

7 Claims, 3 Drawing Sheets

(56) References Cited

U.S. PATENT DOCUMENTS

2017/0164148 A1   6/2017   Kritt

OTHER PUBLICATIONS

"Google+", Wikipedia, <https://en.wikipedia.org/wiki/Google+>, revision dated Dec. 3, 2015; accessed Dec. 4, 2015; 15 pp.
Slegg, J., "Facebook Gives Advertisers More Targeting Options", Search Engine Watch, online <http://searchenginewatch.com/sew/news/2330348/facebook-gives-advertisers-more-targeting-options>, Feb. 21, 2014, 2 pp.
"Best Practices and Guidelines for Location-Based Services", CTIA Wireless Association, Version 2.0, Mar. 23, 2010, 10 pp.
Ray, S.R., "Advertisement-Based Energy Efficient Medium Access Protocols for Wireless Sensor Networks", University of Rochester, Rochester, NY, Department of Electrical and Computer Engineering, 2013, 162 pp.
Non-final office action for U.S. Appl. No. 14/959,667 dated Sep. 22, 2016, 19 pp.
Examiner interview summary for U.S. Appl. No. 14/959,667 dated Mar. 20, 2017, 3 pp.
Notice of allowance for U.S. Appl. No. 14/959,667 dated Apr. 19, 2017, 21 pp.
Corrected notice of allowability for U.S. Appl. No. 14/959,667 dated May 12, 2017, 18 pp.

\* cited by examiner

PERFORMING ACTION BASED ON CURRENT SITUATION OF USER DETERMINED BASED ON AT LEAST DISTANCES BETWEEN DEVICES

BACKGROUND

With the maturation of the Internet, devices are increasingly becoming interconnected. For example, users can communicate with one another wherever they go by using mobile devices like smartphones. Devices that traditionally have not been connected to the Internet have also begun to have Internet connectivity. For example, vehicles like cars and crossovers can report their location, fuel status, and other information via the Internet. As another example, appliances like washing machines, ovens, and refrigerators can report information via the Internet.

SUMMARY

An example method includes determining, by a processing unit, a distance between a mobile device of a user and each of a number of other devices. The method includes determining, by the processing unit, a current situation of the user based on the distances between the mobile device and the other devices. The method includes performing, by the processing unit, an action based on the current situation.

An example computer program product includes a computer readable storage medium having program instructions embodied therein. The computer readable storage medium is not a transitory signal per se. The program instructions are executable by a processor to cause the processor to perform a method. The method includes determining a distance between a mobile device of a user and each of a number of other devices. The method includes determining a current situation of the user based on the distances between the mobile device and the other devices. The method includes performing an action based on the current situation.

An example system includes a processor and a storage device. The storage device is to store predetermined situations of a user of a mobile device. Each predetermined situation corresponds to a set of distances between the mobile device and a number of other devices. The storage device stores actions corresponding to the predetermined situations. The storage device stores computer-executable instructions that the processor executes. The processor executes the instructions to determine a current distance between the mobile device of the user and each other device, select a current situation of the user as the predetermined situation that best matches the current distances between the mobile device and the other devices, and perform the action that corresponds to the current situation of the user.

DETAILED DESCRIPTION

As noted in the background, devices are increasingly interconnected with one another, such as over the Internet. A user may have his or her own mobile device, such as a smartphone, and other users affiliated with this user—such as friends and family—may similarly have their own mobile devices. A user may have other associated devices that can communicate over the Internet, including devices that are mobile, like vehicles such as cars, and devices that are stationary, like appliances. Techniques disclosed herein leverage this interconnection among devices in a novel manner that was impossible prior to the advent of the Internet.

Generally, the distance between the user's mobile device and each other device is determined. Current values of sensors corresponding to some of the other devices are also received. The current situation of the user can be determined based on the distances between his or her mobile devices and the other devices, and further based on the current values of the sensors. Actions are then performed based on the current situation. For example, an appropriate advertisement may be selected and displayed, or a corresponding social networking service post may be posted on a social networking service. Specific examples in this respect are described below.

Figure 1:
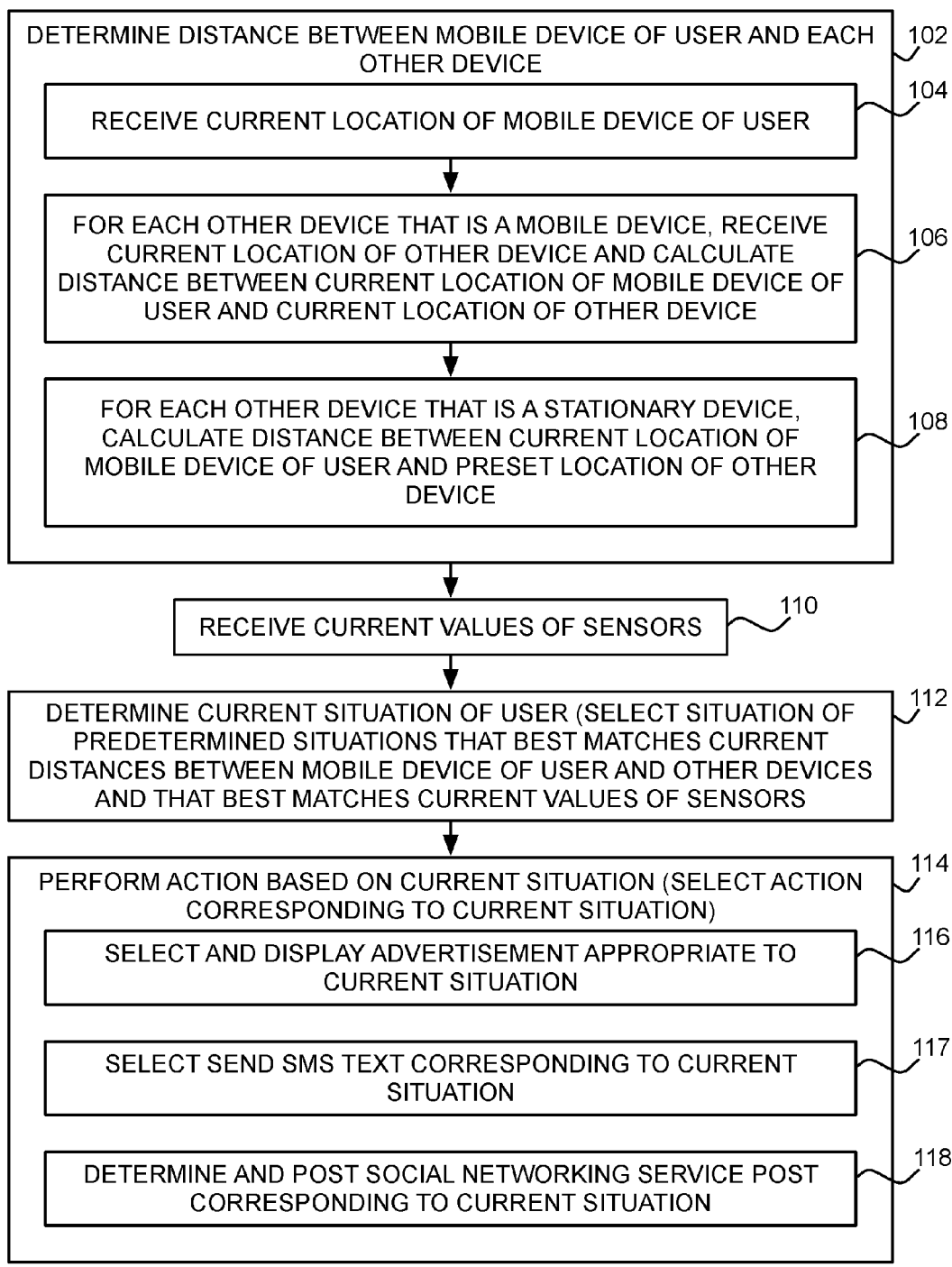
FIG. 1 is a flowchart of an example method for performing an action based on a current situation of a user that is determined based on the distances between the user's mobile device and other devices and/or the current values of sensors.

FIG. 1 shows an example method 100. The example method 100 is performed by a processor. For example, the processor may be that of a mobile computing device, such as a smartphone, of a user. As another example, the processor may be that of a computing device that is a server providing a service to which the user of the mobile computing device subscribes.

The distance between the user's mobile device and each of a number of other devices is determined (102). The other devices can include mobile devices and stationary devices. Examples of mobile devices include mobile devices, like smartphones, of other users affiliated with the user, such as the user's friends and family. Other examples of mobile devices include other mobile devices of or affiliated with the user, such as the user's personal vehicle, a global positioning system (GPS) sensor attached to the collar of the user's pet, a bus or other public transportation that the user commonly takes, and so on. Examples of stationary devices include appliances, like washing machines, refrigerators, ovens, air conditioners, and so on, situated in the user's home, as well as other stationary devices, including televisions, for instance, of the user.

In one implementation, part 102 of the method 100 is performed as follows. The current location of the user's mobile device is received (104). For example, if the mobile device is a smartphone, it typically will have GPS capability, and can report its latitude and longitude to a certain precision. For each other device that is a mobile device, the current location of the other device is similarly received, and the distance between the current location of the user's mobile device and the other (mobile) device is calculated (106). For each other device that is a stationary device, the location of the other device is preset, since even though the device is movable, once moved to a preset location it normally stays there. Therefore, the distance between the current location of the mobile device of the user and the preset location of the other (stationary) device is determined (108).

Current values of sensors can also be received in one implementation (110). Each sensor is associated with one of the other devices, but not every other device may have a sensor or sensors. For example, an air conditioner can report the current temperature of the room in which the thermostat is located, the cooling temperature to which the unit is set, and so on. As another example, a vehicle like a car or crossover can report its fuel level, its current speed, and so on. As a third example, a television can report the current volume level, the channel to which it is being tuned, and so on.

Predetermined situations are specified, where each predetermined situation has a corresponding set of distances between the user's mobile device and one or more other devices, and/or a corresponding set of values of one or more sensors. The current situation of the user is determined from these predetermined situations (112). For instance, the predetermined situation that best matches the current distances between the user's mobile device and the other devices, and/or that best matches the current values of the sensors, is selected as the user's current situation. In one implementation, the predetermined situation further corresponds to the current location of the user's mobile device, and/or the current time or date, in addition to the distances and/or sensor values.

For each predetermined situation, a corresponding action may be specified. Therefore, an action based on the current situation is performed (114), which is the action corresponding to the current situation. One example of an action that can be performed is the selection and display of an advertisement appropriate to the current situation (116). Another example of an action that can be performed is the selection and sending of a short messaging service text corresponding to the current situation (117). A third example is the determination and posting of a social networking service post corresponding to the current situation, to a social networking service (118).

Several examples are now provided as to performance of the method 100, which novelly leverage the interconnected nature of modern devices over the Internet. As a first example, a user's mobile device may be located in the same location as the mobile device of the user's spouse. Furthermore, this location may be far away from the locations of the stationary devices of the user that are located at the user's home. The locations of the mobile devices of the user's children may also be far away from that of the user's mobile device. Therefore, the current situation may be determined as the user being away from home with his or her spouse, without their children. A corresponding action may be to select advertisements for local romantic restaurants and display them on the user's mobile device, particularly if the current time is around dinnertime. It is noted that in these examples, the current situation is further determined based on the location of the user's mobile device in and of itself (in addition to the distance between this location and the locations of other devices), and the current time.

Two other examples are modifications of this example. First, the mobile devices of the user's children may be located near the user's mobile device and near the mobile device of the user's spouse. Therefore, rather than advertisements for romantic restaurants, advertisements for family friendly restaurants may be selected and displayed, since the current situation may be determined as the user being away from home with his or her spouse and children. Second, the mobile devices of the user's spouse and of the user's children may be located far away from the user's mobile device. Therefore, advertisements for takeout and delivery food may be selected and displayed, since the current situation may be determined as the user being away from home alone.

As another example, the distance between the location of the mobile device of the user may be determined as away from the user's house, and close to the mobile device of the user's spouse. The location of the mobile devices of the user's children may also be at the user's house. If the current value of the television is that a television channel has been tuned to that is currently showing an R-rated movie, then the current situation may be that the user's children are home alone and are watching a television program that they are not supposed to be watching without parental supervision. Therefore, the user may receive a short messaging service text on his or her mobile computing device alerting the user to this fact. By comparison, if the location of the mobile device of the user's spouse is also inside the house, then the current situation may be that the user's children are watching an R-rated television program with a parent, in which case no such text may be sent.

As such, the distances between the user's mobile device and the other devices can be used to glean the user's current situation. If the user and his or her family members are at home, then the relative distance between the stationary devices at the house and the mobile devices of the user and of the family members will be minimal. If the relative distance between the mobile devices of the user and of the family members is minimal, but the relative distance between these mobile devices and the stationary devices at the house is large, then the current situation may be that the user is on vacation with the family. If the relative distance between these mobile devices and the user's vehicle is also minimal, then the current situation may be that the family took the vehicle to travel on vacation, whereas if the relative distance between the mobile devices and the vehicle is large, then the current situation may be that the family did not take the vehicle to travel on vacation. As another example, a sensor on the vehicle may report that its fuel level has been low, and has not changed in a long time, in which case the current situation may be that the family did not take the vehicle to travel on vacation, and that the vacation is a long vacation as opposed to a short vacation.

As another example, the location of the user's mobile device and the location of the user's vehicle may be minimal. The current situation may therefore be that the user is driving in his or her car. If the fuel sensor on the user's vehicle reports low fuel, then an advertisement may be displayed for the nearest gas station, so that the user can refuel. However, if the fuel sensor reports low fuel and the location of the user's mobile device and the location of the vehicle is not minimal, then the current situation may be that the user is not driving in his or her car. Therefore, no advertisements may be displayed for the nearest gas station.

As a final example, the location of the user's mobile device may be away from the house, and near the location of a GPS sensor attached to the collar of the user's dog. The current situation is therefore determined as walking the dog, and an action corresponding to this situation may be to post a status update on a social networking service that the user is currently walking his or her dog. By comparison, if the location of the GPS sensor attached to the dog's collar is away from the house, and the location of the user's mobile device and the locations of mobile devices of the user's family members are not near the location of the dog, then the user may instead receive a short messaging service text that the dog has escaped from the house.

In general, then, predetermined situations can be developed either by the user or by another party. Each situation corresponds to the distances between the mobile device of the user and one or more other devices. A situation can further correspond to a value of one or more sensors. When the distances of a predetermined situation and the sensor values of the predetermined situation are satisfied or met by the current distances and the current sensor values, the predetermined situation is deemed the user's current situation, and corresponding actions can be taken. The predetermined situations in this respect can be considered as being rule-based, insofar as the distances and sensor values of a predetermined situation or the conditions that trigger the predetermined situation in question as being considered the current situation of the user.

Figure 2:
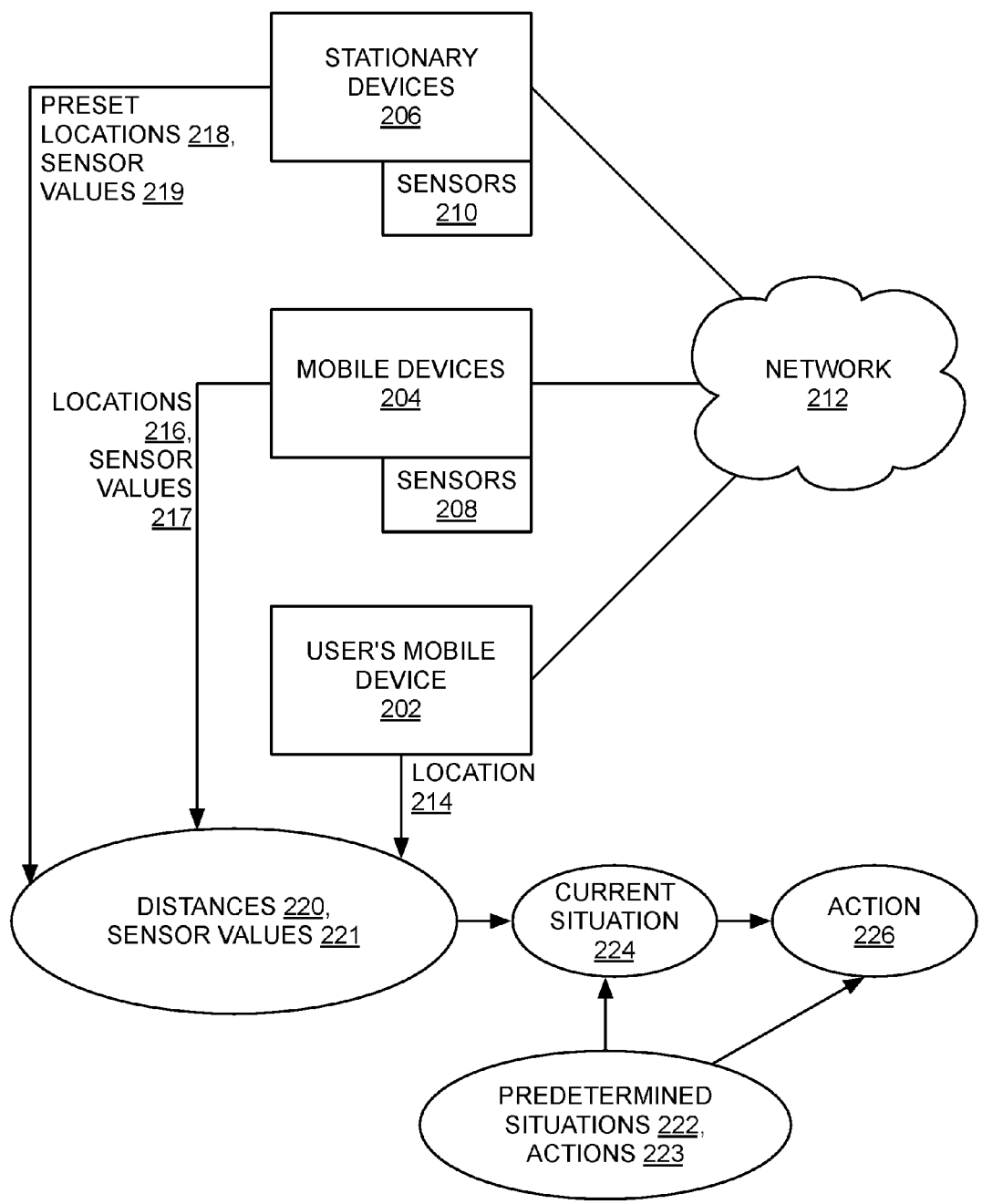
FIG. 2 is a diagram of an example architecture include a user's mobile device, other mobile devices, stationary devices, and sensors.

FIG. 2 shows illustratively an example architecture in the context of which the method 100 is performed. Besides the user's mobile device 202, there are other mobile devices 204 and stationary devices 206. The mobile devices 204 can include sensors 208, and the stationary devices 206 can similarly include sensors 210. The devices 202, 204, and 206 are communicatively interconnected over a network 212, such as the Internet, typically in a wireless manner, but can also be interconnected in a wired manner as to the stationary devices 206.

The location 214 of the user's device 202, the locations 216 of the mobile devices 204, and the preset locations 218 of the stationary devices 206, are used to determine the distances 220 between the user's mobile device 202 and each of these devices 204 and 206. The sensor values 217 from the sensors 208 of the mobile devices 208, and the sensor values 219 from the sensors 210 of the stationary devices 206 are together referred to as the sensor values 221. The distances 220 and the sensor values 221 are used to determine the current situation 224 of the user, as one of the predetermined situations 222 that have corresponding actions 223. The action 226 that corresponds to the current situation 224 is then performed.

Figure 3:
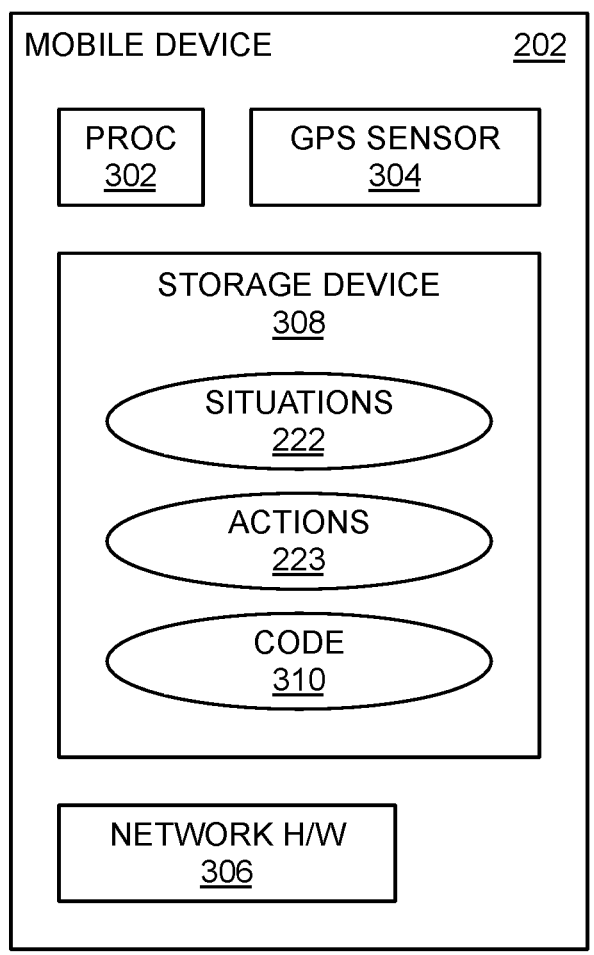
FIG. 3 is a diagram of an example mobile device of a user.

FIG. 3 shows the example mobile device 202 of the user in detail. The mobile device 202 may be a smartphone, for instance. The mobile device 202 includes at least a processor 302, a GPS sensor 304 or other hardware by which the current location of the device 202 can be determined, network hardware 306 to communicatively interconnect with the network 212, and a storage device 308, which may be volatile and/or non-volatile memory, for instance. The storage device 308 stores the predetermined situations 222, their corresponding actions 223, and computer-executable code 310. The processor 302 executes the computer-executable code 310 to perform the method 100 that has been described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A method comprising:
   specifying, by a processing unit, a plurality of predetermined situations, each predetermined situation defined as a particular distance between a mobile device of a user and each of a plurality of other devices;
   determining, by the processing unit, a current distance between the mobile device of the user and each of the other devices;
   determining, by the processing unit, a current situation of the user as a selected predetermined situation having the particular distance between the mobile device of the user and each of the other devices that satisfies the current distance between the mobile device of the user and each of the other devices; and
   performing, by the processing unit, an action based on the current situation;
   wherein the other devices comprise:
   a first other device of a significant other of the user;
   one or more second other devices of children of the user and of the significant other, wherein the predetermined situations comprise:
      a first predetermined situation defined as:
         a distance between the mobile device of the user and the first other device of the significant other of the user less than a nearness threshold;
         a distance between the mobile device of the user and the second devices of the children greater than an awayness threshold;
      a second predetermined situation defined as:
         the distance between the mobile device of the user and the first other device of the significant other of the user less than the nearness threshold;
         the distance between the mobile device of the user and the second other devices of the children less than the nearness threshold;
      a third predetermined situation defined as:
         the distance between the mobile device of the user and the first other device of the significant other of the user greater than the awayness threshold;
         the distance between the mobile device of the user and the second other devices of the children greater than the awayness threshold, and
   wherein performing the action based on the current situation comprises:
      selecting an advertisement corresponding to the current situation, the advertisement being of a first type when the current situation is the first predetermined situation, being of a second type different than the first type when the current situation is the second predetermined situation, and being of a third type different than the first and second types when the current situation is the third predetermined situation.

2. The method of claim 1, wherein the other devices comprise:
   a plurality of mobile devices of other users associated with the user; and
   a plurality of stationary devices associated with the user.

3. The method of claim 2, wherein determining the current distance between the mobile device of the user and each other device comprises:
   receiving a current location of the mobile device of the user;
   for each other device that is one of the mobile devices of the other users, receiving a current location of the other device and calculating the current distance between the current location of the mobile device of the user and the current location of the other device; and
   for each other device that is one of the stationary devices, calculating the current distance between the current location of the mobile device of the user and a preset location of the other device.

4. The method of claim 1, wherein performing the action based on the current situation comprises:
   selecting an advertisement appropriate to the current situation; and
   display the advertisement on the mobile device of the user.

5. The method of claim 1, wherein performing the action based on the current situation comprises:
   determining a social networking service post corresponding to the current situation; and
   posting the social networking service post for the user on a social networking service.

6. The method of claim 1, further comprising:
   receiving, by the processor, current values of sensors, each sensor corresponding to one of the other devices, wherein determining the current situation of the user is further based on the current values of the sensors.

7. The method of claim 1, wherein the other devices comprise:
   a global positioning system (GPS) sensor attached to a pet restraint device of a pet of the user,
   wherein the predetermined situations comprise:
      a first predetermined situation defined as:

the distance between the mobile device of the user and the home of the user greater than an awayness threshold;

the distance between the mobile device of the user and the GPS sensor attached to the pet restraint device of the pet less than a nearness threshold;

a second predetermined situation defined as:

the distance between the mobile device of the user and the home of the user less than the nearness threshold;

the distance between the mobile device of the user and the GPS sensor attached to the pet restraint device of the pet greater than the awayness threshold, and wherein performing the action based on the current situation comprises:

when the current situation is the first predetermined situation, posting a status updated on a social networking service corresponding to the current situation;

when the current situation is the second predetermined situation, sending a message to the mobile device of the user corresponding to the current situation.

* * * * *